United States Patent
Gaset

(10) Patent No.: US 8,484,053 B2
(45) Date of Patent: Jul. 9, 2013

(54) METHOD AND SYSTEM OF COMBINING MONEY TRANSFER SERVICES WITH LIFE INSURANCE

(76) Inventor: Agustin Gaset, Albuquerque, NM (US)

(*) Notice: Subject to any disclaimer, the term of this patent is extended or adjusted under 35 U.S.C. 154(b) by 795 days.

(21) Appl. No.: 12/653,676

(22) Filed: Dec. 16, 2009

(65) Prior Publication Data
US 2011/0145020 A1    Jun. 16, 2011

(51) Int. Cl.
*G06Q 40/00* (2012.01)

(52) U.S. Cl.
USPC ........ 705/4; 705/35; 705/39; 705/40; 705/42; 705/44

(58) Field of Classification Search
USPC ................ 705/4, 35, 39, 40, 42, 44
See application file for complete search history.

(56) References Cited

U.S. PATENT DOCUMENTS
| | | | |
|---|---|---|---|
| 7,797,218 B2 * | 9/2010 | Rosen et al. | 705/36 R |
| 8,271,301 B1 * | 9/2012 | Nordyke et al. | 705/4 |
| 2002/0016763 A1 * | 2/2002 | March | 705/39 |

FOREIGN PATENT DOCUMENTS
EP    1058217 A2 * 12/2000

OTHER PUBLICATIONS

Frances Bender. New Immigrants Catch the Eye or Business. New York Times (1923-Current file) [New York, N.Y] Jul. 18, 1993: CN17.*
Fisher et al. Assessing the Impact of the USA Patriot Act on the Financial Services Industry. Journal of Money Laundering Control Mar. 2005; 8, 3; Proquest Central. p. 243.*

* cited by examiner

*Primary Examiner* — Muriel Tinkler

(57) ABSTRACT

The present invention is a new business method that intends to reduce the risk, help, and protect the economic security of the foreign families who are dependants from the income that come from the foreign workers inside the U.S.A. territory. The invention helps by offering protection through a life insurance by combining the Money Transmission Service and the Life Insurance Service. The invention cares for both the worker residing inside the U.S.A. territory and the family members inside foreign territory.

14 Claims, 5 Drawing Sheets

METHOD AND SYSTEM OF COMBINING MONEY TRANSFER SERVICES WITH LIFE INSURANCE

BACKGROUND OF THE INVENTION

1. Field of the Invention

The present invention is a new business method that intends to reduce the risk, help, and protect the economic security of the foreign families who are dependants from the income that come from the foreign workers inside the U.S.A. territory. The invention helps by offering protection through a life insurance by combining the Money Transmission Service and the Life Insurance Service. The invention cares for both the worker residing inside the U.S.A. territory and the family members inside foreign territory.

2. Description of the Prior Art

The prior art has never protect and covered the risk of the economic security of the foreign families from the point of view of the immigrants inside U.S.A. for several reasons; the complete lack of experience with foreign workers inside the U.S.A. territory, the shortened background in the real necessities of the foreign immigrant workers. The poor knowledge of the foreign customs, traditions and ideologies while living and working inside the U.S.A. territory.

The prior art continue to develop technology with out considering the idiosyncrasy of the foreign workers living in the U.S.A. neither create real solutions for the protection of those that use money transfer services during their living time in the U.S.A. The prior art offer life insurance in many ways, but none of the prior art is combining the money transfer services and life insurance to protect the life of those foreign workers living in the U.S.A.

This invention is new because the operation is different from the prior art of previous inventions and existing knowledge. I have general knowledge in the industry and have never seen such invention in the market. The invention is novel pending the results of my prior art search. The invention is not obvious because nobody has thought of it before. I invented a way to connect both industries together which are the money transfer services and the life insurance services along with a computer animated system to transform the data of the users and beneficiaries. These two industries with my invention help achieve to protect the economic security for the foreign families as never before. This invention is not obvious because I did what others in the field have tried but failed to achieve the same result. I have accomplished the invention of what others have said could not be done. This invention has been praised by others in the field. Most importantly, there has been a need in the industry for my invention.

THE PRESENT INVENTION HAS ONE OR MORE OF THE FOLLOWING ADVANTAGES

My invention filled a niche in the market that no one has filled;
I know how to do it;
According to the marketing research result, there is a high demand for my invention;
The invention has a positive effect on society;
The invention's efficacy is not diminished over time;
This invention is distinctive in the market;
My invention provides a valuable service;
The consumers will find this invention compatible with their needs and way of life;
The consumers will have the exact same perception of the primary function of this invention which is the efficient monetary protection for their families;
There is several ways to estimate the potential sales;
The stage of development in my invention is complete;
The invention has a huge potential to expand in this particular market;
The invention allows the insurance companies of foreign countries, the money transfer companies, among some other businesses to anticipate in protecting this specific market;
The invention covers a real need, and it can be projected like a social commitment with the consumers;
The invention is affordable in the market;
The invention is related with another product which is the Money Transmission Service and will provide them an aggregated value that can be offered as an additional benefit to the consumers among some other businesses;
This invention permits to include an additional value to the actual services in the market, which will produce higher sales based on a sense of loyalty and trustworthy for all the people involved in the process.

DETAILED DESCRIPTION OF THE INVENTION

Figure 1:
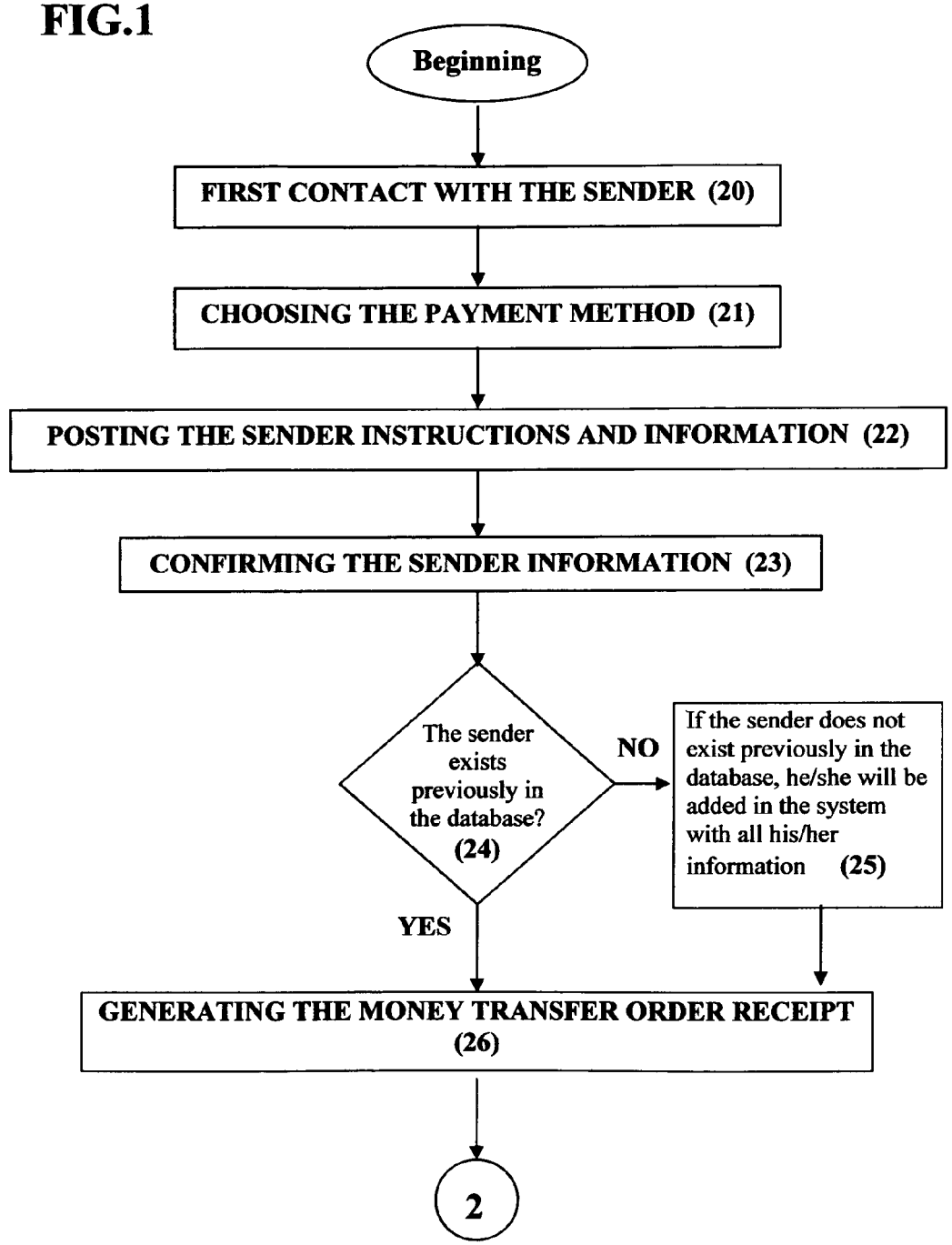
FIG. 1 The flowchart demonstrates the process of a Money Transfer Company inside the U.S.A. and diverse steps.

The components of the invention are:

A Money Transfer Company; The Money Transfer Company offers the money transfer services with a life insurance protection for its clients. This Money Transfer Company have an office in U.S.A. and a representation office inside a foreign country, while operating through agents inside U.S.A. This Money Transfer Company is linked with an insurance company by a life insurance contract agreement. A bank can also offer the services that the Money Transfer Company offers to the Insurance Company for purposes of this invention.

An insurance company; The insurance company offers life insurance protection. This insurance company is linked with a Money Transfer Company by a life insurance contract agreement to protect its clients. A bank can also offer the services that the Insurance Company offers to the Money Transfer Company for purposes of this invention.

An agent inside the U.S.A.; The agent inside the U.S.A. offers the service of an agency to collect the sender's information, instructions and the information of the recipient, as well as to offer the service of money transfer inside their business in exchange for a commission. The agent needs to be linked with the Money Transfer Company by a contract agreement. The agent may or may not offer the money transfer services as an additional service to the main activity of their businesses. The agents can be a bank branch, a money exchange center, a store, a supermarket, messenger services companies, or package delivery companies, a bus station, a gas station, global providers of specialized transportation and logistics services companies, travel agencies, credit unions, companies that provide loan services, or any other business that can offer the money transfer services in a convenient way.

A payment center inside foreign country; the payment center inside foreign territory offers a place for the recipient to collect the money, and provides information about the insurance policy. This payment center is linked with the Money Transfer Company by a contract agreement. In exchange for a commission, the payment center permits the transfer of money inside the foreign territory. The payment center may or may not offer the money transfer services as part of the main activity of their businesses. The payment center can be a bank branch, a money exchange center, a store, a supermarket, messenger services companies, or package delivery companies, a bus station, a gas station, global providers of specialized transportation and logistics services companies, travel agencies, credit unions, companies that provide loan services, or any other business that can offer the money transfer services in a convenient way.

A client from the Money Transfer Company (hereinafter referred to as "sender") who resides inside the U.S.A.; The sender is the complementary policy holder described in the life insurance policy.

A foreign family member of the sender who reside inside a foreign country (hereinafter referred to as "recipient"); The recipient is the main policy holder described in the life insurance policy.

A debit card; The debit card can be used to make the payment of the money transfer service or to receive the money that has been sent by the sender. The debit card can also be used to receive the payment of the life insurance policy incase of death.

A credit card; The credit card can be used to make the payment of the money transfer service or to receive the money that has been sent by the sender. The credit card can also be used to receive the payment of the life insurance policy incase of death.

A computer animated system; The computer animated system most be a software capable of collect data from users, second to store data into a machine, third to transform the data and allowed the insurance company to be combined with the money transfer services.

The Money Transfer Company offers the service to send money from the U.S.A. to a foreign country or vice versa. At the same time, the Money Transfer Company also handles a life insurance contract agreement with an insurance company. In the contract agreement, the client of the Money Transfer Company or sender and their family member inside the foreign country or recipient are covered in case a death happens.

The reciprocal life insurance mode is a policy that covers two or more people at the same time when the policy is used. The policy refers the two people as the main policy holder and the complementary policy holder.

The insurance policy contract will contain all the exclusions, conditions and promise benefits and the payment period.

The Money Transfer Company will have to pay the policies to the insurance company; the payment period will be covered in the contract between the Money Transfer Company and the insurance company. The payment can be each day, per week, or per month, etc. The policy contract must be lawfully registered with the government through Insurance authorities. The policy contract will have an assigned number to identify this policy contract between the Money Transfer Company and the Insurance Company.

First Contact with the Sender (20)

The Money Transfer Company will need to programming a computer to accept users information; storing the user information; allowing users to select reciprocal life insurance; allowing users to select money transfers associated therewith; and combining insurance to protect two or more people at the same time.

In the FIG. 1 At the beginning of the process, the money transfer service is offered to the public through a web or network of agents inside the U.S.A. that holds a contract with the Money Transfer Company. The agent will offer the service of the money transmission and will collect, confirm and store the required information of the sender's (complementary policy holder) and their families or recipient (main policy holder) in order to make possible the service of money transmission and to protect them with the life insurance policy.

The Money Transfer Company will count with a computer system; an agent; a call center of a Money Transfer Company to collect, confirm and store the information of the main policy holder and complementary policy holder provided by a sender using the money transfer service.

The agent helps to collect, confirm and store the information and instructions of the sender in the U.S. territory. Then, the agent makes a phone call to the call center of the Money Transfer Company or post the information manually in the system provided by the Money Transfer Company. The information and instructions of the sender contain the following: the name, address, e-mail address, date of birth, and phone number of the sender (complementary policy holder); the name, address, e-mail address, and phone number of the recipient (main policy holder) who is going to receive the money in a foreign country; ID of the sender, the amount of money that the sender wishes to send; the sender can also provide his information and instructions by telephone or by internet with the Money Transfer Company system.

Choosing the Payment Method (21)

The sender will choose the payment method. This is how the recipient or family member inside foreign territory will receive the money. The sender also will need to choose the currency of the payment which can be U.S. dollars or any other currency. Option one. The recipient can receive the money in a debit card or credit card which is in possession of the recipient inside a foreign country. Option two. The recipient can receive the money in an existing bank account under the name of the recipient inside a foreign country. This can be in any currency depending on the bank account. Option three. The recipient can receive the money through a payment center inside the a foreign country. Option four. The recipient can receive the money through a bank branch, in which the recipient do not hold a bank account inside a foreign country.

Posting the Sender Instructions and Information (22)

The agent helps to collect, confirm and store the information and instructions of the sender in U.S.A. and provide this information to the Money Transfer Company. For this step, the agent has two options: Option one. The agent can make a phone call to the call center of the Money Transfer Company in which case it will be an operator of the Money Transfer Company who will input the information into the system. Option two. The agent can post the information himself in the system of the money transfer company by internet. The sender also can post the information himself in the system of the Money Transfer Company by internet. The sender can make a phone call to the call center of the Money Transfer Company; in this case the operator would do the work of an agent. This again if the Money Transfer Company provides such availability.

Confirming the Sender Information (23)

Once the Money Transfer Company receives the information of the sender in its database, the Money Transfer Company will verify if this person exist previously in the database or not. This part of the process will be divided in two parts depending if the sender exist previously in the database (24) then the Money Transfer Company will confirm or update the sender's information. If the sender does not exist previously in the database (25) then, he/she will be added in the system or database with all his/her information. The Money Transfer Company can assign an ID number to the sender to identify him/her in the future.

Generating the Money Transfer Order Receipt (26)

Once the transaction has been processed and the information has been gathered and confirmed, then, the Money Transfer Company will generate a money transfer order receipt.

The money transfer order receipt will contain the following: 1.—The ID number of the money transfer order. 2.—The agency, agent name, and address in which the money transfer order was made. This if the order was made through an agent. 3.—The date of when the transaction was processed. 4.—The ID number of the operator from the Money Transfer Company call centers. This is if the order was made by phone. 5.—The ID number of the sender assigned by the Money Transfer Company. 6.—The name of the sender. 7.—The name of the recipient who is going to receive the money inside a foreign territory.

8.—The method of payment chosen by the sender can be the following: 8-a.—The number of the debit card or credit card in which the money will be deposited or loaded if the sender will choose the option one. 8-b.—The bank account number, the name of the person who owns the account, name of the bank, and address in which the recipient inside a foreign country is going to receive the money; this is if the sender will choose the option two. 8-c.—The name of the payment center and address where the money will be collected inside a foreign country; this is if the sender will choose the option three. 8-d.—The name of the bank, the bank branch address, in which the recipient does not hold a bank account inside a foreign country; this is if the sender will choose the option four. 9.—The amount of the money transfer order. 10.—The fees charged for the money transfer service. 11.—The exchange rate of the money transfer order offered by the Money Transfer Company for that date, this if the payment will be made to the recipient in a foreign currency, however, if the payment will be made in U.S. dollars then the exchange rate will be in U.S. dollars as well.

Receiving the Payment from the Sender and Sending the Money Transfer Order Receipt (27)

Figure 2:
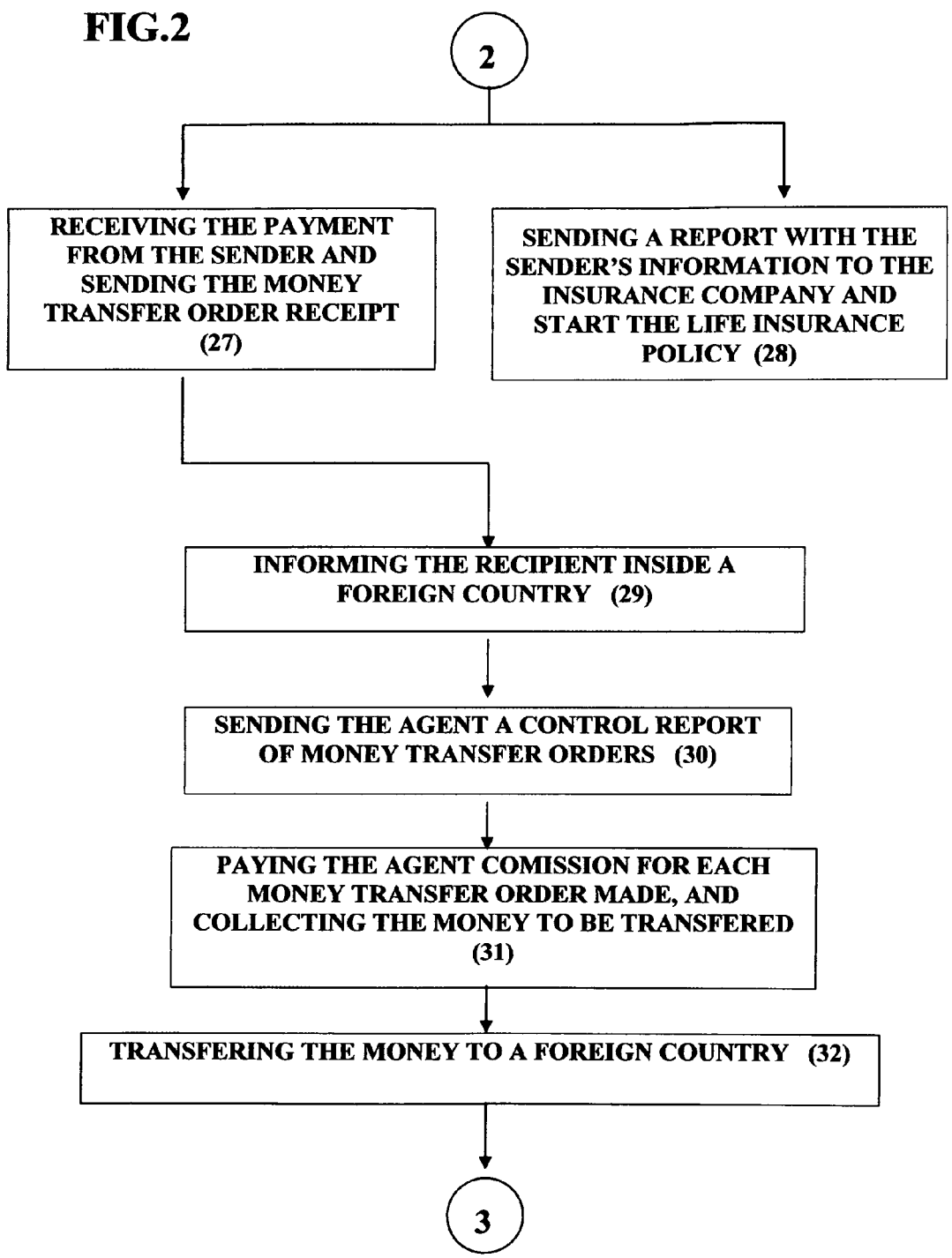
FIG. 2 The flowchart shows the continuation of the process and diverse steps.

In FIG. 2 The sender in U.S.A. will pay the fees of the money transfer service along with the amount of the money that is going to be transferred. This payment can be done by a debit card, credit card, if the money transfer order was made through an agent the payment can also be made by check, cashers check, money order, or cash. Once the Money Transfer Company has received the payment of the fees for the money transfer service and the amount of money that is going to be transferred, then the Money Transfer Company will send the money order transfer receipt to the sender. If the money transfer order was made through an agent, then the receipt will be reproduced in two duplicates and be sent to the agent. The receipt can be sent also by fax, internet, or if the Money Transfer Company system allows the receipt to be printed inside the agency. Then the sender will sign one copy of the money transfer order receipt and give it to the agent, then the agent will keep it for its records. The agent will sign the other copy of the money transfer order receipt and give it to the sender; the sender will keep it for his records. If the money transfer order was made through internet or by telephone by the sender, then the Money Transfer Company will send the money order transfer receipt to the sender, by fax, internet, mail or e-mail.

Sending a Report with the Sender Information to the Insurance Company and Start the Life Insurance Policy (28)

The Money Transfer Company will send the information to the insurance company for each operation, this to start the life insurance procedure and to determine the number of premiums that the Money Transfer Company has process.

The computer system of a Money Transfer Company is required to send the information of the sender and the recipient to the insurance company for each operation; the insurance company starts the life insurance procedure and determines the number of premiums that the Money Transfer Company has to process.

Next imputing data into a computer system of a Money Transfer Company; determining the number of premiums that the Money Transfer Company will have to pay to the insurance company; determining the period according to the contract between the insurance company and the Money Transfer Company.

This step can be made with an automated system link between the Money Transfer Company and the insurance company. The Insurance Company will require the following information: 1.—The ID number of the life insurance policy which can be the same ID number of the money transfer order. 2.—The date when the money transfer order transaction was executed. This date will be considered the same date that the life insurance policy was solicited. 3.—The names of the persons covered by the life insurance policy. These names are referred as: The main policy holder which is the recipient and/or family member of the sender, and the complementary policy holder which is the sender.

Informing the Recipient Inside a Foreign Country (29)

The sender and/or the Money Transfer Company must inform to the recipient the following: 1.—The ID number of the money transfer order. 2.—The amount of the money transfer order. 3.—The method of payment chosen by the sender; 3-a.—The number of the debit card or credit card in which the money will be deposited or loaded if the sender chose the option one; 3-b.—The bank account number of the recipient, the name of the recipient who owns the account, name of the bank for the recipient, and address in which the recipient is going to receive the money; this is if the sender will prefer the option Two. 3-c.—The name of the payment center and address where the money will be collected inside a foreign country; this is if the sender will prefer the option three. 3-d.—The name of the bank, the bank branch address, where the money will be collected if the recipient does not hold a bank account inside a foreign country; this is if the sender decides option four.

4.—The fees charged for the money transfer service. 5.—The currency of payment and exchange rate of the money transfer order. 6.—The specifications of the life insurance policy containing the following: 6-a.—The amount covered in the life insurance policy, 6-b.—The time period in which the life insurance will cover, including the number of days in which the policy's specifies that will cover the promise. 6-c.—The names of the persons covered in the life insurance policy. This is the main policy holder which is the recipient inside a foreign country, and the complementary policy holder which is the sender.

Sending the Agent a Control Report of Money Transfer Order (30)

The Money Transfer Company will send to every agent by fax or internet a control report of all transactions activities made by the agent at the end of the day. This report will contain the following: the ID number of the money transfer orders made by the agent, the amounts of the money transfer orders, the fees charges for the money transfer service, the commissions for the agent. This specific report is only for the money transfer orders that were made through an agent. For all other money transfers made by telephone or internet base system the report will be generated by the Money Transfer Company for the Money Transfer Company use only.

Paying the Agent's Commission for Each Money Transfer Order Made, and Collecting the Money to be Transferred (31)

The agent will make the deposits with the amounts of all money transfer orders, plus the fees charges for the money transfer service into the bank account of the Money Transfer Company inside the U.S.A. These amounts will be according to the control report sent by the Money Transfer Company to the agent. The agent will send by fax to the Money Transfer Company copies of the deposit receipt provided by the bank. Once the Money Transfer Company receives the deposits from the agent, the money transfer company must verify that the amounts match from the control report that was sent to the agent the day before.

If the amounts of the deposits do not match with the total amounts from the control report, then the Money Transfer Company will inform the agent to correct the mistake and deposit the correct amount. Therefore, the deposit will match the report. The agent retains his commissions for each money transfer order that was made from his agency. This may change according to the agreement between the Money Transfer Company and the agent. Another option will be, the Money Transfer Company can pay to the agent per week, or monthly, etc., by sending a check or depositing the agent commissions in the bank account of the agent. If the payment has been made by a debit card or credit card then the amounts of all money transfer orders, plus the fees charges for the money transfer service will go directly into the bank account of the Money Transfer Company in U.S.A.

Transferring the Money to a Foreign Country (32)

Once the Money Transfer Company has the correct amount of money deposited in its bank account inside the U.S.A., then the Money Transfer Company will make a wire transfer for the same amount into the foreign country bank account of the Money Transfer Company. When the wire transfer is posted, the U.S. currency will be converted into a foreign country currency at the exchange rate of the specific date when the wire transfer was sent. After all this is done, the Money Transfer Company will have in his custody the money to be paid to the family members of its clients inside a foreign country in the legal foreign currency. This same procedure will occur with every other currency.

Sending the Payment Center and/or Bank the Payment Receipt for the Recipient (33)

Figure 3:
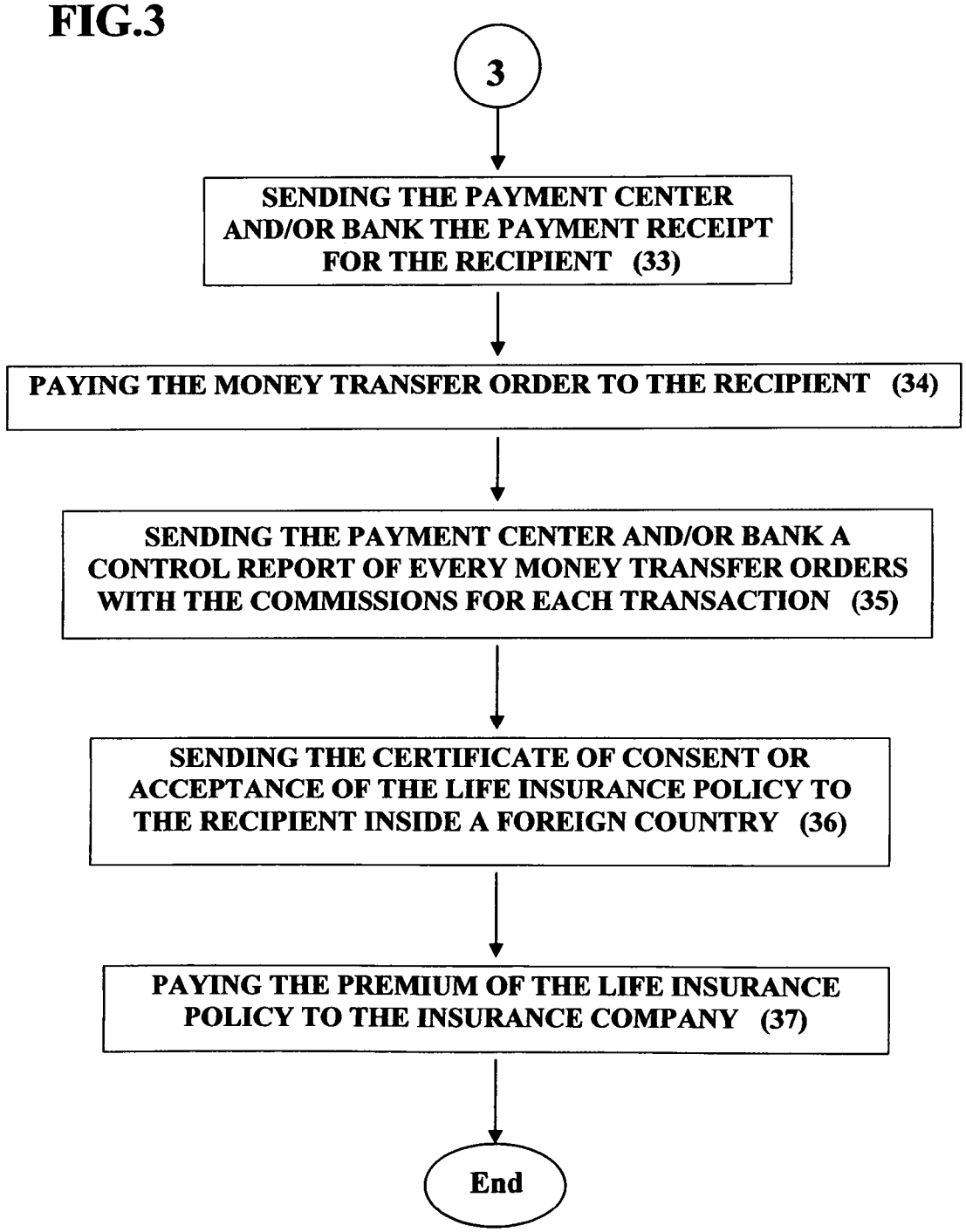
FIG. 3 The flowchart shows the diverse steps continuation and end of the process.

In FIG. 3 the Money Transfer Company will produce a payment receipt of each money transfer order transaction in two duplicates and send it by fax or internet to each payment center or bank when its client choose the payment methods three or four. One duplicate will go to the recipient as a receipt of payment when they collect the money from the payment center, or a bank. The second duplicate will be for the records of the payment center or bank.

The computer system of a Money Transfer Company is required to produce life insurance policy notification; producing a payment receipt for the recipient of each money transfer order transaction; and explaining that the recipient has a protection of a life insurance.

The payment receipt will contain the following: the name of the Money Transfer Company, the name of the payment center or bank, the name of the recipient, the telephone number of the recipient, the ID number of the money transfer order, the signature line for the recipient's signature, the ID number line for the recipient's ID number; this can be an official valid ID from the foreign country government such as: driver license number, passport number, voter card number, military card number, etc., the amount of the money transfer order, specifying the currency for the payment. If the payment method to the recipient will be through a debit card or credit card it will depend if the debit card or credit card allow deposits to be loaded in a different currency than U.S. Dollar. There will be a brief message explaining that the recipient has a protection of a life insurance.

The Money Transfer Company system will be producing a message containing the ID number of the life insurance policy, the contact information of the insurance company and/or Money Transfer Company, contact information for claiming the insurance policy money in case of death and the name of the insurance company that holds an agreement with the Money Transfer Company.

Paying the Money Transfer Order to the Recipient (34)

The Money Transfer Company will proceed to pay to the recipient according to the payment method that the sender chose before. The Money Transfer Company will pay the amount of each money transfer order in the following options: Option one. The Money Transfer Company will pay or load the amount of the money transfer order into a debit card or credit card which is in possession of the recipient inside a foreign country. With Option one, if the debit or credit card is linked to a U.S. bank, then the money will be loaded in U.S. dollars and the money will remain in the same currency. When the money has been taken out through an ATM machine or made a purchase with the debit or credit card inside the foreign country, the U.S. currency will be converted into legal currency of that foreign country automatically. This same procedure will occur with every other currency. Option two. The Money Transfer Company will pay the amount of the money transfer order in an existing bank account under the name of the recipient inside a foreign country. This can be in any currency, depending on the bank account of the recipient.

The Money Transfer Company will proceed to pay the commission for each money transfer order to the payment center and/or bank when the sender chose the payment method in the following options: Option three. The Money Transfer Company will pay the amount of the money transfer order including the payment center commission for each operation by depositing in the bank account of the payment center, if the sender chose the Option three. The payment center will retain it's commission for each money transfer order that it will pay and a copy of the payment receipt will have the signature signed by the recipient when the money is collected inside the payment center inside a foreign country. Option four. If the sender chose Option four, the Money Transfer Company will pay the amount of the money transfer order including the bank's commission to the bank which holds an agreement for such purposes with the Money Transfer Company. The bank will pay through its bank branch network to the recipient, even if the recipient does not hold a bank account in that bank. The bank will retain its commission for each money transfer order. The bank will also provide a copy of the payment receipt with the signature by the recipient.

The recipient will collect the money from the payment center or bank only after identifying him/her self with a proper ID such as a: driver license, passport or, voter card. The recipient must sign the payment receipt copy for the payment center or bank. The Option three and Option four can also be done by having a previous arrangement with the payment center or bank inside a foreign country. The payment center or bank can finance the Money Transfer Company if necessary and will pay the amount of each money transfer order to the recipient before the payment center or bank receives the deposit from the Money Transfer Company covering this same amount. This step is necessary to make the service faster by paying immediately each money transfer order. The payment to the recipient can be done in U.S. dollars or any currency depending on the payment center or bank services.

Sending the Payment Center and/or Bank a Control Report of Every Money Transfer Order with the Commission for Each Transaction (35)

The Money Transfer Company will produce a control report for each money transfer order transaction made and will send it by fax or internet to each payment center or bank once the sender chose the payment methods three or four. This control report will be for the records of the payment center or bank. The control report will contain the following: the name of the Money Transfer Company, the name of the payment center or bank, the date, the name of the recipient, the ID number of the money transfer order, the amount of the money transfer order specifying if the payment is in other currency, the commission for the money transfer order that is paid to the recipient through the payment center or bank.

Sending the Certificate of Consent or Acceptance of the Life Insurance Policy to the Recipient Inside a Foreign Country (36)

The computer system of a Money Transfer Company is required to produce a certificate of consent or acceptance of the life insurance policy; The system will produce a certificate for each operation.

To deliver the certificate of consent or acceptance of the life insurance policy to the main policy holder inside a foreign country, the Money Transfer Company system will send the certificate by e-mail, fax, mail or through the payment centers network. The certificate of consent or acceptance of the life insurance policy can be produced as well by the Insurance Company and forward to the main policy holder through the Money Transfer Company system or payment center network.

The Money Transfer Company system will create the certificate of consent or acceptance of the life insurance policy containing: ID number of policy; the ID number assigned by the Insurance authorities identifying this policy contract; the name of the life insurance company; the name of the Money Transfer Company; the name of the main policy holder, the name of the complementary policy holder, the time of initiation and expiration of the life insurance; the conditions, benefits and exclusions of the life insurance; the coverage amount of the life insurance; optional boxes to indicate the relation between the main policy holder and the complementary policy holder. The insurance company can send and request the signature on the certificate of consent or acceptance of the life insurance policy to the main policy holder. This could be done in one or more of the following: by internet, by mail, by fax, or by a branch of the life insurance company.

Paying the Premium of the Life Insurance Policy to the Insurance Company (37)

The Money Transfer Company has to pay the premium of each operation that was processed. The amount of the payment will be determined by the number of operations reported to the Insurance Company by the Money Transfer Company in the step of (please referred to paragraph 0052 titled Sending A Report with the Sender's Information to the Insurance Company and Start the Life Insurance Policy). The amount to be paid will cover all the premiums inside the period of time according to the contract between the Money Transfer Company and the Insurance Company. The payment will be made into the bank account of the Insurance Company. This payment can be made by a deposit or wire transfer. This payment of the premiums will be made at the time and currency specified in the contract between the Money Transfer Company and the Insurance Company. The amount of the payment must coincide with the total number of reports sent by the Money Transfer Company to the Insurance Company.

Procedure of Claiming the Money of the Life Insurance Policy when the Main Policy Holder is the Survivor Inside a Foreign Country (38)

Figure 4:
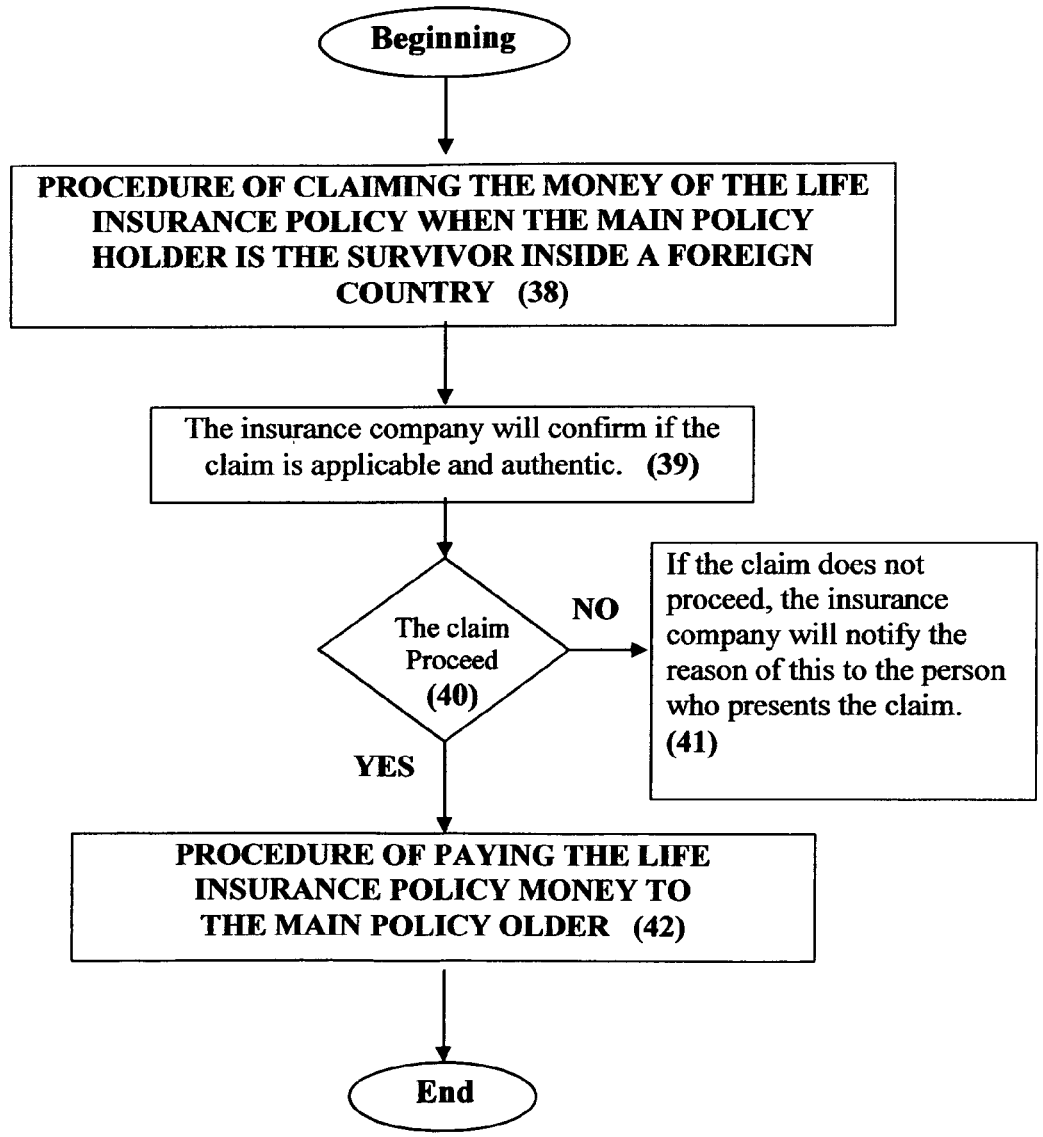
FIG. 4 The flowchart demonstrates the complete procedure of claiming the money from a foreign country.

In FIG. 4, the next process occurs when the sender passes away, and the main policy holder or recipient is the survivor inside a foreign country. By using a computer system of a Money Transfer Company to start the procedure of claiming the money of the life insurance policy for the main policy holder or recipient that is the survivor inside the foreign country; calling for the presentation of the claim of the life insurance policy by reporting the deceased of the sender or complementary policy holder.

To present the claim of the life insurance policy, the main policy holder must report the deceased of the complementary policy holder; The main policy holder will present the claim to the Insurance Company through the network of payment centers of the Money Transfer Company; the system of the Money Transfer Company will generate a report and send all the information of the main policy holder claim to the Insurance Company.

The computer system of the Money Transfer Company will produce a report for the Insurance Company containing the claim information made by the main policy holder through the Money Transfer Company payment centers network.

The survivor of the policy can also follow the normal procedure of the Insurance Company to collect the amount of the policy inside a foreign country by presenting the following documents: 1.—Payment application or claim. This application is provided by the Insurance Company; 2.—Death certificate of the deceased person covered in the policy; 3.—Birth certificate of the deceased person. This is to prove the relationship between the survivor of the policy and the deceased person such as a son, daughter, father, or mother, etc.; 4.—Marriage certificate. This is to prove the relationship between the survivor of the policy and the deceased person such as a husband or wife. In case of a concubine relationship, the survivor of the policy should prove to be living with the deceased person as a couple. 5.—The payment receipt of the money transfer order; 6.—And official ID such as a: driver license, passport or, voter card. Then next, the Insurance Company (39) will confirm if the claim is applicable and authentic to verify if the claim will proceed or not (40). If the claim does not proceed (41), then the Insurance Company will notify and explain the reason to the person who presents the claim. If the claim of the previous step proceeds, the Insurance Company will formulate the proper proceedings to pay the covered amount to the main policy holder.

Procedure of Paying the Money of the Life Insurance Policy to the Main Policy Holder (42)

The Insurance Company will pay to the main policy holder by making a deposit in the bank account of the main policy holder, by check, by a money transfer service, or by making a deposit into the debit or credit card of the main policy holder. The payment will be for the specified amount covered in the life insurance policy. The Insurance Company will request the signature of the main policy holder as proof of payment. The main policy holder will receive the money of the life insurance policy showing his/her ID and sign the receipt of payment. The Insurance Company will keep the signed payment receipt of the life insurance policy for their records. The legal requirements of the life insurance policy will be covered only if the life insurance policy contains the accurate name of the sender inside the U.S.A. and the accurate name of the recipient inside a foreign country.

Procedure of Claiming the Money of the Life Insurance Policy when the Complementary Policy Holder is the Survivor Inside U.S.A. (43)

Figure 5:
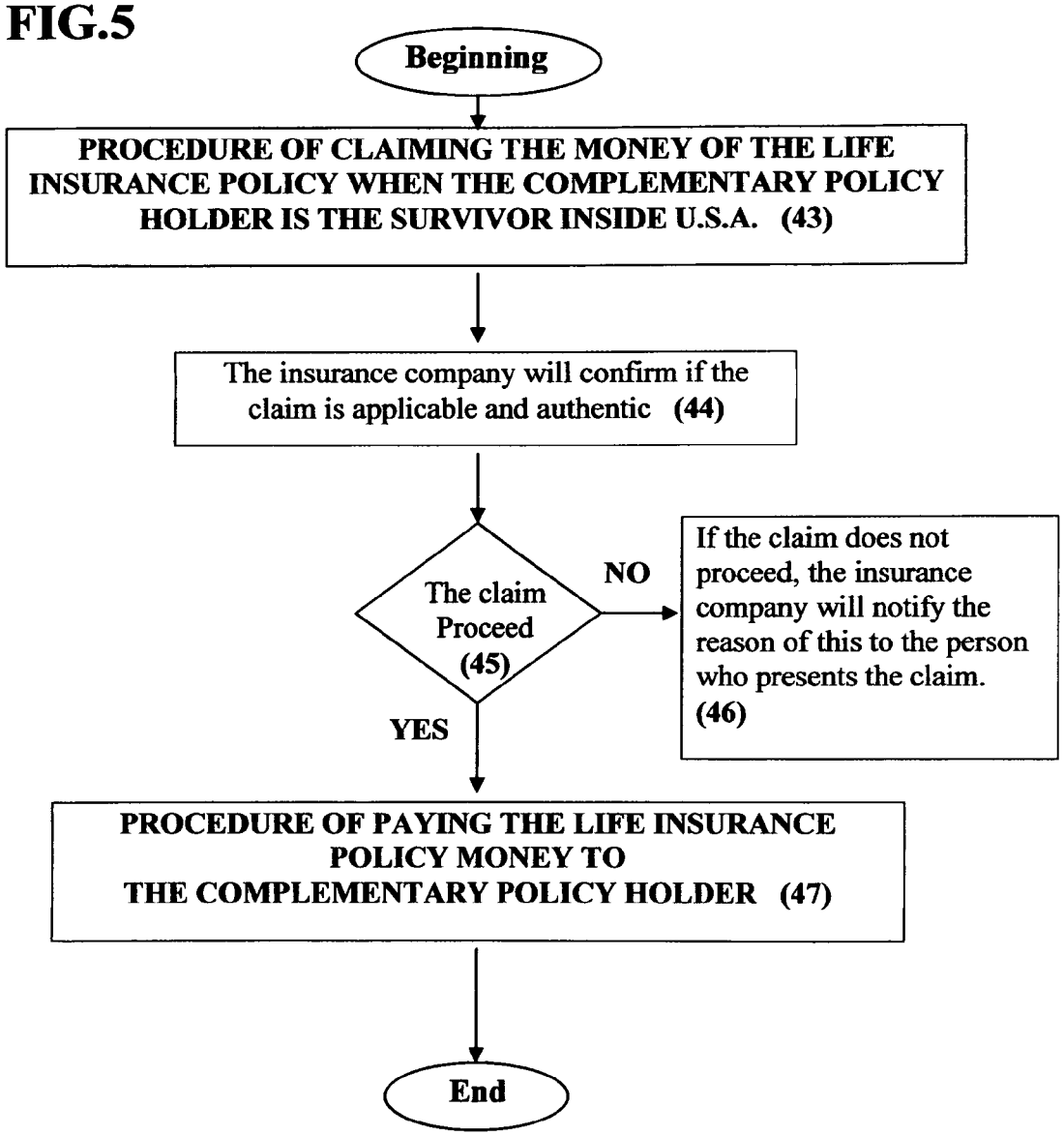
FIG. 5 The flowchart demonstrates the procedure of claiming the money from U.S.A.

In FIG. 5, the next process occurs when the recipient has passed away. When the sender or complementary policy holder is the survivor of the policy inside the U.S.A. territory, the sender or complementary policy holder must use the computer system of a Money Transfer Company to start the procedure of claiming the money of the life insurance policy; calling for the presentation of the claim of the life insurance policy by reporting the death, of the main policy holder in a foreign country. The complementary policy holder, survivor of the policy inside the U.S.A. territory, can also present the claim of the life insurance policy by reporting the decease of the main policy holder in a foreign country. The complementary policy holder of the life insurance policy can present the claim by using different options in the following: Option (A).—Through a Money Transfer Company agent in the U.S.A. territory, Option (B).—By phone-call or mail to the Money Transfer Company, Option (C).—Through the Insurance Company, by mail, in person, or through a third person in their foreign country.

Option (A): By using the computer system of a Money Transfer Company the complementary policy holder inside the U.S.A. territory can present the claim of the insurance policy through the Money Transfer Company agent inside the U.S.A. territory; then he/she will indicate the address, the name of the agent, and the desired location to receive the amount of the insurance policy inside the U.S.A. territory; the agent will use the Money Transfer System to show detailed information of the complementary policy holder.

Once the Money Transfer Company collects the information of the complementary policy holder, then the computer system of the Money Transfer Company will generate a report and send it to the Insurance Company electronically; the report for the Insurance Company will contain the following: the ID number of the policy, the name of the complementary policy holder, the name of the main policy holder, and the date when the report was produced.

Option (B): The complementary policy holder inside the U.S.A. territory can present the claim by phone-call or mail to the Money Transfer Company. Then the Money Transfer Company will collect the information of the complementary policy holder. Once the Money Transfer Company collects the information of the complementary policy holder, then the Money Transfer Company will produce a report and send it to the Insurance Company. The report for the Insurance Company will contain the following: the ID number of the policy, the name of the complementary policy holder or sender, the name of the main policy holder or recipient, and the date when the report was produce.

Option (C): The complementary policy holder can present the claim of the insurance policy through the Insurance Company by mail, in person, or through a third person in a foreign country. Next, the Insurance Company (44) will confirm if the claim is applicable and authentic to verify if the claim will proceed or not (45). If the claim does not proceed (46), then the Insurance Company will notify and explain the reason to the person who presents the claim. If the claim proceeds, the Insurance Company will formulate the proper proceedings to pay the covered amount to the complementary policy holder.

Procedure of Paying the Life Insurance Policy Money to the Complementary Policy Holder (47)

The Insurance Company will pay the amount of the life insurance policy to the complementary policy holder in U.S.A. through the Money Transfer Company system by making a deposit in the bank account of the Money Transfer Company; Once the Money Transfer Company gets the money in its bank account, then the Money Transfer Company can pay to the complementary policy holder, the survivor of the policy, either by check, by making a deposit into a debit card, a credit card or a bank account of the complementary policy holder.

If the complementary policy holder decides to present the claim through a Money Transfer Company agent, then the Money Transfer Company will disperse the amount of the life insurance policy through the agent who was selected by the complementary policy holder inside U.S.A. by depositing the money of the life insurance policy in the bank account of the agent; Then, the agent would receive a commission for paying the money to the complementary policy holder. The payment for the complementary policy holder will be for the specified amount covered in the life insurance policy. The Money Transfer Company will print out the payment receipt of the life insurance policy and send it to the agent by internet or by fax.

The computer system of the Money Transfer Company will create a receipt of the payment for the life insurance policy which will contain the following: the ID number of the insurance policy, the name of the persons covered in the insurance policy, the amount covered by the life insurance policy in U.S. dollars, the exchange rate of the day when the payment will happen, the signed space for the signature of the complementary policy holder survivor of the life insurance policy, the ID number line for the complementary policy holder survivor of the life insurance policy. The ID can be an official valid ID from the foreign country or U.S.A. government such as a driver license number, a passport number, a voter card number, military card number, etc. The Money Transfer Company will send a control report of the payment of the life insurance policy to the agent.

The computer system of the Money Transfer Company will create a control report of the payment for the life insurance policy which will contain the following: the date, the agent's name, agent's address, the ID number of the insurance policy, agent's commission, the amount for the life insurance policy, and the name of the complementary policy holder survivor of the life insurance policy.

The agent will request a signature for the payment receipt from the complementary policy holder. The agent will retain his commission and will pay the amount for the life insurance policy to the complementary policy holder, survivor of the life insurance policy. The complementary policy holder, survivor of the life insurance policy, receives the money of the life insurance policy by showing his/her ID and the signed receipt of payment. The agent will keep the signed payment receipt of the life insurance policy for his records. The legal requirements of the life insurance policy will be covered only if the life insurance policy contains the accurate name of the sender inside the U.S.A. territory and the accurate name of the recipient.

What is claimed is:

1. A method of combining a Money Transfer Service and a life insurance service comprising the steps of:
providing, by the Money Transfer Company, an agent;

collecting, confirming and storing, via a computer system of the Money Transfer Company, information of the main policy holder and the one or more complementary policy holders;

providing, by the life insurance company, a reciprocal life insurance product that protects the main policy holder and the one or more complementary policy holders at the same time;

sending, by the computer system of the Money Transfer Company, a required control report of money transfer orders to the insurance company every time the agent makes a transaction within a predetermined period of time, wherein, the control report of money transfer order contains the identification (ID) number of the money transfer orders made by the agent, the amounts of the money transfer orders, the fees charged for the money transfer service, and, a number of premiums that the Money Transfer Company has to pay to the insurance company; and, starting the reciprocal life insurance policy, by the life insurance company.

2. The method according to claim 1, further comprising the steps of: determining, by the life insurance company, the period according to a contract between the insurance company and the Money Transfer Company.

3. The method according to claim 2, further comprising the steps of: producing, by the life insurance company, a payment receipt for the recipient of each money transfer order transaction; and explaining the terms of the life insurance product to the recipient.

4. The method according to claim 3 further comprising the steps of: producing, by the life insurance company, a message containing the ID number of the life insurance policy, the contact information of the insurance company or Money Transfer Company, contact information for claiming the reciprocal life insurance policy money in case of death and the name of the insurance company that holds an agreement with the Money Transfer Company.

5. The method according to claim 4, further comprising the steps of: producing a required certificate of consent or acceptance of the life insurance policy, using the computer system of the Money Transfer Company, for every transaction made by agent within the predetermined period of time.

6. The method according to claim 5, further comprising the steps of: delivering the certificate of consent or acceptance of the life insurance policy to the main policy holder inside a foreign country, via the Money transfer company or the Insurance company, wherein, if the certificate of consent or acceptance is sent from the Money Transfer Company, it may be delivered using any of the following: e-mail, fax, mail or through a payment center's network, wherein a payment center is a bank, wherein, if the certificate of consent or acceptance is sent from the Insurance Company, it is sent to the Money Transfer Company or the payment center for delivery.

7. The method according to claim 6, wherein the certificate of consent or acceptance of the life insurance policy further contains: ID number of policy; the ID number assigned by the Insurance authorities identifying this policy contract; the name of the life insurance company; the name of the Money Transfer Company; the name of the main policy holder, the name of the complementary policy holder, the time of initiation and expiration of the life insurance; the conditions, benefits and exclusions of the life insurance; the coverage amount of the life insurance; and, optional boxes to indicate the relation between the main policy holder and the complementary policy holder.

8. An automated system of combining a Money Transfer Service and a life insurance service comprising:

a life insurance agent;

a computer system of the Money Transfer Company that collecting, confirming and storing, information of the main policy holder and the one or more complementary policy holders;

a life insurance company providing a reciprocal life insurance product protecting the main policy holder and the one or more complementary policy holders at the same time;

the computer system of the Money Transfer Company sending a required control report of money transfer orders to the insurance company every time the agent makes a transaction within a predetermined period of time, wherein, the control report of money transfer order contains the identification (ID) number of the money transfer orders made by the agent, the amounts of the money transfer orders, the fees charged for the money transfer service, and, the number of premiums the Money Transfer Company has to pay the life insurance company; and, the life insurance company starting the reciprocal life insurance policy.

9. The method according to claim 8, further comprising: the life insurance company determining the period according to a contract between the insurance company and the Money Transfer Company.

10. The method according to claim 9, further comprising: the life insurance company producing a payment receipt for the recipient of each money transfer order transaction and explaining the terms of the life insurance product to the recipient.

11. The method according to claim 10, further comprising: the life insurance company producing a message containing the ID number of the life insurance policy, the contact information of the insurance company or Money Transfer Company, contact information for claiming the reciprocal life insurance policy money in case of death and the name of the insurance company that holds an agreement with the Money Transfer Company.

12. The method according to claim 11, further comprising: the computer system of the Money Transfer Company producing a required certificate of consent or acceptance of the life insurance policy for every transaction made by agent within the predetermined period of time.

13. The method according to claim 12: the Money transfer company or the Insurance company delivering the certificate of consent or acceptance of the life insurance policy to the main policy holder inside a foreign country, wherein, if the certificate of consent or acceptance is sent from the Money Transfer Company, it may be delivered using any of the following: e-mail, fax, mail or through a payment center's network, wherein a payment center is a bank, wherein, if the certificate of consent or acceptance is sent from the Insurance Company, it is sent to the Money Transfer Company or the payment center for delivery.

14. The method according to claim 13, wherein the certificate of consent or acceptance of the life insurance policy further contains: ID number of policy; the ID number assigned by the Insurance authorities identifying this policy contract; the name of the life insurance company; the name of the Money Transfer Company; the name of the main policy holder, the name of the complementary policy holder, the time of initiation and expiration of the life insurance; the conditions, benefits and exclusions of the life insurance; the coverage amount of the life insurance; and, optional boxes to indicate the relation between the main policy holder and the complementary policy holder.

* * * * *